US006395376B1

(12) United States Patent
Cooley

(10) Patent No.: US 6,395,376 B1
(45) Date of Patent: May 28, 2002

(54) TAMPER INDICATING ADHESIVE DEVICE

(75) Inventor: Julian B. Cooley, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/235,926

(22) Filed: Jan. 22, 1999

(51) Int. Cl.$^{7}$ ............................ B32B 27/14; B32B 3/00

(52) U.S. Cl. .................... 428/195; 428/206; 428/304.4; 428/916

(58) Field of Search .......................... 428/195, 34, 916, 428/304.4, 206

(56) References Cited

U.S. PATENT DOCUMENTS

| | | | | |
|---|---|---|---|---|
| 4,239,826 A | | 12/1980 | Knott, II et al. | 428/35 |
| 4,254,169 A | | 3/1981 | Schroeder | 428/35 |
| 4,362,844 A | | 12/1982 | Lemstra et al. | |
| 4,419,408 A | | 12/1983 | Schmukler et al. | 428/424.4 |
| 4,539,256 A | * | 9/1985 | Shipman | 428/315.5 |
| 4,630,891 A | | 12/1986 | Li | 350/105 |
| 4,652,473 A | | 3/1987 | Han | 428/35 |
| 4,726,984 A | | 2/1988 | Shah | 428/216 |
| 4,828,915 A | | 5/1989 | Schroeder et al. | 428/332 |
| 4,876,123 A | | 10/1989 | Rivera et al. | 428/34.2 |
| 4,980,222 A | | 12/1990 | Rivera et al. | 428/195 |
| 5,153,042 A | | 10/1992 | Indrelie | 428/40 |
| 5,190,812 A | | 3/1993 | Joseph et al. | |
| 5,277,915 A | | 1/1994 | Weng et al. | 428/343 |
| 5,277,971 A | | 1/1994 | Weng et al. | 428/343 |
| 5,384,170 A | * | 1/1995 | Bastioli et al. | 428/34.1 |
| 5,405,692 A | | 4/1995 | Weng et al. | 428/343 |
| 5,660,925 A | * | 8/1997 | Cooley et al. | 428/304.4 |
| 5,677,360 A | * | 10/1997 | Yamamori et al. | 521/134 |

OTHER PUBLICATIONS

*Plastics Films, Third Edition*, by John H. Briston, Longman Scientific & Technical in association with The Plastics and Rubber Institute, Introduction page and pp. 74–79.

* cited by examiner

*Primary Examiner*—Bruce H. Hess
*Assistant Examiner*—B. Shewareged
(74) *Attorney, Agent, or Firm*—James J. Trussell; Carolyn V. Peters

(57) ABSTRACT

A tamper indicating device includes a light transmissive backing and a layer of adhesive. The backing comprises a blown film including a first, continuous phase and a second, discontinuous phase. The backing is normally light transmissive, and becomes opaque upon tampering sufficient to internally delaminate said backing. Preferably, the blown film contains from 60 to 85 parts by weight of the first, continuous phase and from 15 to 40 parts by weight of the second, discontinuous phase. More preferably, the first phase comprises polypropylene and the second phase comprises an ethylene/vinyl acetate copolymer or ethylene/vinyl alcohol ant copolymer or an ethylene/vinyl acetate/vinyl alcohol terpolymer. The tamper indicating device can include either or both of an initially viewable indicia that becomes obscured upon internal delamination of the backing and a latent indicia that becomes viewable upon internal delamination of the backing.

7 Claims, 1 Drawing Sheet

TAMPER INDICATING ADHESIVE DEVICE

TECHNICAL FIELD

The present invention relates to tamper indicating adhesive devices, and more particularly to devices such as tapes, labels, and label stock that indicate tampering attempts through tearing or internal delamination.

BACKGROUND OF THE INVENTION

It is known to provide a tamper indicating device which may be adhered to various articles. Devices are known that indicate tampering by changing their appearance upon attempts to remove the device from the article.

It may be desirable to place the tamper indicating device on the article to provide some type of information, such a serial number or other identification, or to provide an indication of the authenticity of the article. In such a case, it is desirable to provide an indication of tampering to prevent the device with the information thereon from being removed and re-adhered to another article.

It may be desirable to place the tamper indicating device on an article that is some type of container for the contents inside the article. In such a case, it may be desirable to provide a tamper indicating device across two separable portions of the article. For example, it may be desirable to adhere the tamper indicating device both to the flap and the main body of a carton or envelope. In this way, removal of the tamper indicating device to gain access to the contents will cause the device to provide an indication of tampering.

U.S. Pat. No. 4,876,123, assigned to the assignee of the present application, discloses a light transmissive film derived from a composition comprising 50 to 85 parts by weight of a first copolymer comprising at least one moiety derived from at least one olefinic monomeric unit and 50 to 15 parts by weight of a second copolymer comprising at least one moiety derived from at least one vinyl alcohol monomeric unit and said second copolymer being sufficiently incompatible with said first copolymer such that two phases are formed within said film, one of said phases being continuous. The film can be made into a tape including various colorants and indicia that provide an indication of tampering. When the film delaminates, such as upon attempts to remove it from a container, it becomes opaque so that first indicia are obscured when viewed through the delaminated film, but second indicia become perceptible over the delaminated opaque film. The '123 patent explains that "the film may be produced by any suitable film generating process, but is preferably produced by dry blending the first and second polymers together, air drying the blend at 200° F. for 48 hours, then extruding the blend onto a driven chilled roll. Preferably, the film is at least 0.003 inches in thickness. At thicknesses less than 0.003 inches, voids form on the surfaces of the film." Column 3, line 63, through column 4, line 2.

U.S. Pat. No. 4,980,222, also assigned to the assignee of the present application, discloses tamper indicating tape based on the same film as that disclosed in the '123 patent. The devices discloses in the '222 patent include various arrangements for obscuring and revealing tamper indicating messages, and various ways for adhering the tape to articles.

SUMMARY OF THE INVENTION

Although the commercial success of available tamper indicating devices has been impressive, it is desirable to further improve the performance of tamper indicating devices. The present invention provides tamper indicating devices such as tapes, labels, and label stock that comprise a film backing that is thinner and more easily torn or delaminated than the film backing of known devices. Films that tear or internally delaminate more easily are more sensitive and will indicate tampering more readily than thicker, stronger film backings. Surprisingly, such thin film backings can be made by the blown film extrusion process. This process provides thin film that is sensitive to attempts at tampering, yet strong enough to be conveniently and economically handled and converted in products.

One aspect of the present invention provides a tamper indicating device. The device comprises a blown film backing and a layer of adhesive. The backing includes a first, continuous phase and a second, discontinuous phase. The backing is normally light transmissive and becomes opaque upon internal delamination of the backing.

In one preferred embodiment of the above tamper indicating device, the blown film backing contains from 60 to 85 parts by weight of the first, continuous phase and from 15 to 40 parts per weight of the second, discontinuous phase. The first continuous phase preferably comprises a polyolefin. More preferably the first, continuous phase comprises at least 90 parts by weight of a polyolefin having 2 to 4 carbon atoms. The second, discontinuous phase preferably comprises an ethylene/vinyl acetate copolymer or ethylene/vinyl alcohol copolymer. Optionally, the second, discontinuous phase comprises a hydrolyzed ethylene/vinyl acetate copolymer. Alternatively, the second, discontinuous phase comprises an ethylene/vinyl acetate/vinyl alcohol terpolymer, which is preferably essentially completely hydrolyzed, In another preferred embodiment of the above tamper indicating device, the blown film backing has a draw ratio of at least 10:1. In one aspect of this embodiment, the blown film backing has a blow-up ratio of at least 1.56:1.

In another preferred embodiment of the above tamper indicating device, the blown film backing has a thickness of up to 0.003 inches. More preferably, the blown film backing has a thickness of up to 0.002 inches.

In another preferred embodiment of the above tamper indicating device, the device includes an overlaminate layer on the backing opposite the adhesive.

In another preferred embodiment of the above tamper indicating device, the device includes an initially viewable indicia that becomes obscured upon internal delamination of the blown film backing.

In another preferred embodiment of the above tamper indicating device, the device includes a latent indicia that becomes viewable upon internal delamination of the blown film backing.

In another aspect, the present invention provides an alternative tamper indicating device. The device comprises a blown film backing and a layer of adhesive. The blown film backing comprises: a) 60 to 85 parts by weight of a first, continuous phase comprising a polyolefin; and b) 15 to 40 parts by weight of a second, discontinuous phase comprising an ethylene/vinyl acetate copolymer or ethylene/vinyl alcohol copolymer, or an ethylene/vinyl acetate/vinyl alcohol terpolymer which is preferably essentially completely hydrolyzed. The blown film backing is normally light transmissive and becomes opaque upon internal delamination of the backing.

In one preferred embodiment of the above tamper indicating device, the first, continuous phase comprises at least 90 parts by weight polyolefin having 2 to 4 carbon atoms, and the second, discontinuous phase comprises an ethylene/vinyl acetate/vinyl alcohol terpolymer. Preferably, the blown film backing has a thickness of up to 0.003 inches. More preferably, the blown film backing has a thickness of up to 0.002 inches.

In another preferred embodiment of the above tamper indicating device, the device includes an initially viewable indicia that becomes obscured upon internal delamination of the blown film backing.

In another preferred embodiment of the above tamper indicating device, the device includes a latent indicia that becomes viewable upon internal delamination of the blown film backing.

In yet another aspect, the present invention provides another alternative tamper indicating device. The device comprises a film backing and a layer of adhesive. The film backing has a thickness of up to 0.002 inches. The film backing comprises: a) 60 to 85 parts by weight of a first, continuous phase comprising a polyolefin; and b) 15 to 40 parts by weight of a second, discontinuous phase comprising an ethylene/vinyl acetate copolymer or ethylene/vinyl alcohol copolymer, or an ethylene/vinyl acetate/vinyl alcohol terpolymer which is preferably essentially completely hydrolyzed. The film backing is normally light transmissive and becomes opaque upon internal delamination of the backing.

In a preferred embodiment of the above tamper indicating device, the backing comprises a blown film.

In another preferred embodiment of the above tamper indicating device, the device includes an initially viewable indicia that becomes obscured upon internal delamination of the backing.

In another preferred embodiment of the above tamper indicating device, the device includes a latent indicia that becomes viewable upon internal delamination of the backing.

The present invention also provides an article including any of the tamper indicating devices described herein adhered to the article. The tamper indicating device is adhered to the article by the adhesive with an adhesive bond strength, and the backing has a delamination strength less than the bond strength.

In yet a further aspect, the present invention provides a further alternative tamper indicating device. The device comprises a blown film backing and a layer of adhesive. The blown film backing comprises: a) 60 to 85 parts by weight of a first, continuous phase comprising a polyolefin; and b) 15 to 40 parts by weight of a second, discontinuous phase comprising an ethylene/vinyl acetate copolymer or ethylene/vinyl alcohol copolymer, or an ethylene/vinyl acetate/vinyl alcohol terpolymer which is preferably essentially completely hydrolyzed.

In one preferred embodiment of the above tamper indicating device, the first, continuous phase comprises at least 90 parts by weight polyolefin having 2 to 4 carbon atoms, and the second, discontinuous phase comprises an ethylene/vinyl acetate/vinyl alcohol terpolymer which is preferably essentially completely hydrolyzed.

In another preferred embodiment of the above tamper indicating device, the blown film backing has a thickness of up to 0.003 inches. More preferably, the blown film backing has a thickness of up to 0.002 inches.

The present invention also includes an article having the above tamper indicating device adhered to the article. The device is adhered by the adhesive with an adhesive bond strength, and the device has a tear strength less than the bond strength.

The present invention also includes the blown film backings described herein, along with the methods of manufacture of such film backings and tamper indicating devices.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
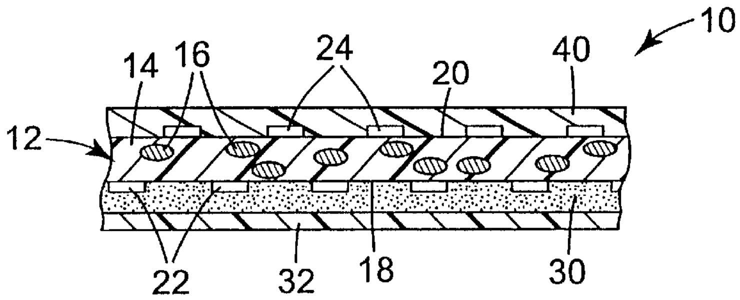
FIG. 1 is a cross-sectional view of a preferred embodiment of a tamper indicating device of the present invention.

Referring now to the drawing, there is shown in FIG. 1 a preferred embodiment of a tamper indicating device according to the present invention generally designated by the reference numeral 10. Tamper indicating device 10 is typically in the form of a tape, label, or labelstock. Tamper indicating device 10 includes a light transmissive backing 12. Backing 12 includes a first major surface 18 and a second major surface 20. Backing 12 is constructed so that the backing delaminates internally (i.e. between the first and second major surfaces) when a predetermined level of peel force is applied to the backing, or so that the device 10 tears or strips when the device is removed from an article.

As seen in FIG. 1, the backing comprises two materials sufficiently incompatible so as to form two phases within the backing 12. The first phase 14 is continuous and is formed by the first material. The second phase 16, formed from the second material, is discontinuous and forms a multiplicity of inclusions 16 in the first phase of the backing, typically spherical or ellipsoidal in shape. The backing 12 is a blown film backing.

Backing 12 comprises a blown film derived from a composition comprising 60 to 85 parts by weight of the first material, preferably a polyolefin, and 40 to 15 parts by weight of the second material. The second material preferably is an ethylene/vinyl acetate copolymer, optionally a hydrolyzed ethylene/vinyl acetate copolymer, an ethylene/vinyl alcohol copolymer, or an ethylene/vinyl acetate/vinyl alcohol terpolymer, which is preferably essentially completely hydrolyzed.

In one embodiment of the invention, the first material includes from 0 to 15 parts by weight of a polar copolymerizable monomeric unit (with respect to the olefin) substantially free of hydroxy (—OH) groups such as, for example, acrylic acid, acrylonitrile, bicyclo [2,2,1] hept-2-ene, bis (2-chloroethyl) vinylphosphonate, carbon monoxide, diethyl fumarate, diethyl maleate, ethyl acrylate, methacrylic acid, N-methyl-N-vinyl/acetamide, styrene, vinyl acetate, vinyl chloride, and vinyl fluoride. Preferably, the polar copolymerizable monomeric unit comprises acrylic acid, methacrylic acid or vinyl acetate.

In one preferred embodiment, the first material comprises at least 90 parts by weight (pbw) olefinic monomeric units having 2 to 4 carbon atoms, in a more preferred embodiment, the first material comprises about 91 pbw propylene monomeric units and up to 9 pbw ethylene monomeric units, and in the most preferred embodiment, the first polymer comprises about 97 pbw propylene monomeric units and from about 2.2 pbw to about 2.7 pbw ethylene monomeric units.

Suitable commercially available first materials include FINA 7231, a random copolymer of propylene/ethylene with an approximate ratio of 97:3 respectively; and FINA Z9470, a random copolymer of propylene/ethylene with an approximate ratio of 91:9 respectively (both available from FINA Oil and Chemical Company, Dallas Tex.).

Suitable commercially available second materials include ELVAL LC-E105A, an ethylene/vinyl acetate/vinyl alcohol terpolymer containing 44 mole percent ethylene, which is essentially completely hydrolyzed (available from EVAL Company of America, Lisle, Ill.); and ELVAX 660, an ethylene/vinyl acetate copolymer (available from E. I. du Pont de Nemours and Company, Wilmington Del.).

When it is desired to have a backing that will delaminate rather than tear upon attempts to remove the tape, it is preferred that the backing film 12 comprises about 75% of the first material 14 and about 25% of the second material 16. The first material preferably comprises about 97 pbw propylene monomeric units and from about 2.2 pbw to about 2.7 pbw ethylene monomeric units. The second material preferably comprises an ethylene/vinyl acetate/vinyl alcohol terpolymer, which is preferably essentially completely hydrolyzed. When it is desired to have a backing that will tear rather than delaminate upon attempts to remove the tape, it is preferred that the backing film 12 comprises about 60% of the first material and about 40% of the second material. The first material comprises about 97 pbw propylene monomeric units and from about 2.2 pbw to about 2.7 pbw ethylene monomeric units. The second material preferably comprises an ethylene/vinyl acetate/vinyl alcohol terpolymer, which is preferably essentially completely hydrolyzed.

The inclusions 16 formed by the second material typically are approximately 1 micron or smaller, although the invention is not limited to this size. While not wishing to be bound by any theory, it is believed that the inclusions formed by the second, discontinuous phase 16 provide a pattern of weaknesses within the first, continuous phase 14 of the first polymer. Thus, the tear or delamination force of the backing 12 is predetermined at a desired level depending on the materials selected and their relative ratios.

Backings produced according to the present invention have high light transmissivity levels and low haze, even though the phase separated morphology due to the incompatibility of the first and second materials might be expected to form opaque backings. It is believed that the relative size of the inclusions and the closeness of the indices of refractions of the components of the backing are such that the backing has good light transmissive properties.

Applicant has surprisingly found that when the preferred compositions described herein are made into film by the blown film extrusion process, backing film 12 can be made thinner than was previously available, preferably less than 0.003 inches (0.076 mm) thick, more preferably 0.002 inches (0.051 mm) thick or less, and most preferably approximately 0.001 (0.025 mm) inches thick. Such thin backings 12 will have a lower delamination strength (also referred to as cohesive strength) or a lower tear strength than known backings, thus rendering the tamper indicating device 10 more sensitive to attempts at removal or other tampering techniques. In some cases, it may be desirable that the backing film 12 be 0.003 inches (0.076 mm) thick or greater, which is also possible with the present invention.

The details of the blown film extrusion process are well known to those in the art and need not be discussed in great detail herein. Preferred film backings can be made according to the following general description. The desired blend of the first material and second material is introduced into a pilot scale, low pressure, 2.5 inch diameter single screw extruder having a length:diameter ratio of 24:1, and having 4 temperature zones set at increasing temperatures as follows: Zone 1=300° F.; Zone 2=370° F.; Zone 3=400° F.; and Zone 4=410° F. The film is formed on a blown film extrusion apparatus as follows: a 12 inch diameter annular die having a temperature at the top and bottom of 400° F.; a cone size of 19 inches; an extruder screw of speed 78 revolutions per minute (rpm) and the use of inside air with a rotating air tank. The film with an air bubble is fed upwards approximately 30 feet and then through a nip at a pressure of 15 psi t6 give a flat bubble size of 27.375 inches. The blow-up ratio is 1.56 to 1 and the draw ratio is about 10 to 1. The run speed is 47.5 feet per minute a(fpm) and the output is 185 pounds per hours A film backing having a thickness of approximately 0.002 inches can be obtained. Selection of components for the blown film extrusion line and the setting of the various parameters on such a line can be made by those of skill in the art to obtain the desired thickness, blow-up ratio, draw ratio, and other characteristics. For example, the extruder screw speed can be 130 rpm, the draw ratio can be 20:1, and run speed can be 50.2 fpm to obtain a film backing having a thickness of 0.001 inches. Furthermore, the parameters that control the extrusion process and apparatus will vary depending on the particular apparatus and materials employed.

The tamper indicating device 10 optionally includes first indicia 22 on first major surface 18 of backing 12. The tamper indicating device may optionally include second indicia 24 on the second major surface 20 of the backing 12. The tamper indicating device may include either one or both of the first and second indicia 22, 24.

Means are provided to adhere the backing to an article. The adhesive means includes adhesive 30 coated on first major surface 18 of the backing. The adhesive should be selected such that the adhesive bond between the adhesive 30 and the article 50 to which the device 10 is adhered is greater than the cohesive strength of the backing 12, or greater than the tear strength of the device 10, as appropriate. In this manner, attempts to remove the device 10 by overcoming the adhesive bond to the article will cause the device to tear or delaminate. Although any suitable adhesive may be used, such as a heat activated adhesive or a pressure sensitive adhesive, in the preferred embodiment of the invention, the adhesive comprises a pressure sensitive adhesive. Pressure sensitive adhesives are normally tacky at room temperature and can be adhered to a surface by application of, at most, light finger pressure. A general description of useful pressure sensitive adhesives may be found in *Encyclopedia of Polymer Science and Engineering,* Vol. 13, Wiley-Interscience Publishers (New York, 1988). Additional description of useful pressure sensitive adhesives may be found in *Encyclopedia of Polymer Science and Technology,* Vol. 1, Interscience Publishers (New York, 1964). Examples of pressure sensitive adhesives include resin tackified synthetic rubber adhesives, and in particular styrene-butadiene rubber, styrene-isoprene-styrene block copolymer and styrene-butadiene-styrene block copolymer; and acrylic adhesives and in particular isooctylacrylate/acrylic acid copolymer; and tackified natural rubber adhesives. For instance, 3M Laminating Adhesive 9442 available from Minnesota Mining and Manufacturing Company, St. Paul, Minn. has been found suitable for use as adhesive 30 in the tamper indicating device 10 of this invention. The adhesive may be covered by a removable liner, such as a silicone release liner 32.

The device 10 may optionally include an overlaminate 40 that can be attached to the second surface 20 of the backing 12, such as by adhesives, extrusion lamination, or co-extrusion. The overlaminate can be used to protect information printed on the film backing 12 from alteration or removal. Preferred materials for the overlaminate include films of polyester, polypropylene, polycarbonate, and SURLYN resin available from E. I. du Pont de Nemours and Company, Wilmington Del. One preferred film is a 0.001 inch (.025 mm) polyester film with an acrylic based adhesive commercially available as 3M 7831 Film from Minnesota Mining and Manufacturing Company, St. Paul, Minn. Depending on the material and the intended use, the overlaminate will typically have a thickness of from 0.0005 to 0.005 inches (0.013 to 0.13 mm). If present, second indicia may be between the backing 12 and overlaminate 40, either on the second surface of the backing or on the surface of the overlaminate facing the backing. Additional indicia may be provided on either side of the overlaminate 40, if desired.

Figure 2:
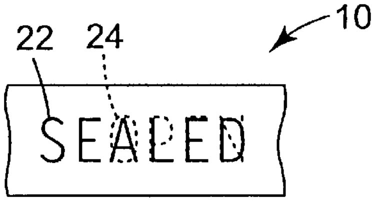
FIG. 2 is a top view of the device of FIG. 1.

In one preferred embodiment shown in FIG. 1, first indicia 22 indicates one condition of the device 10, and second indicia 24 indicates another condition of the device 10 of this invention. First indicia 22 and second indicia 24 have contrasting colors, and adhesive 30 is of the same color as the second indicia 24. For instance, first indicia 22 may be colored blue with second indicia 24 and adhesive 30 colored red. In this manner, first indicia 22 is initially visually perceptible through the backing 12 as shown in FIG. 2. The second indicia 24, initially a latent indicia, is masked from view because the second indicia has insufficient contrast against the adhesive 10.

Figure 3:
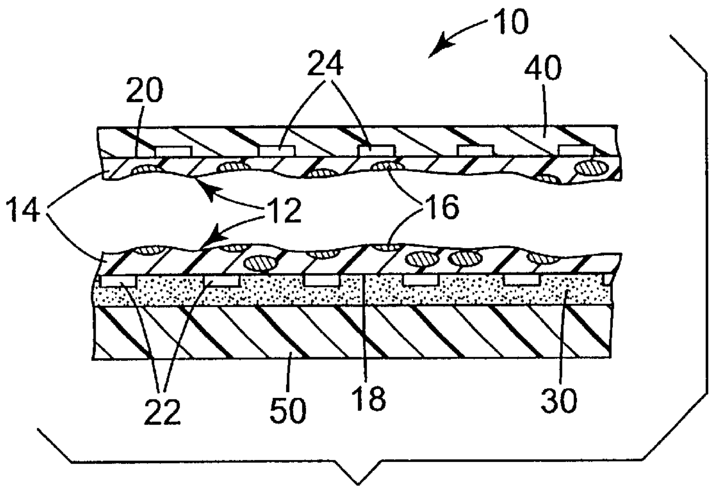
FIG. 3 is a cross-sectional view of the device of FIG. 1 adhered to an article and in a delaminated state.
Figure 4:
FIG. 4 is a top view of the device of FIG. 3.

As seen in FIG. 3, adhesive 30 bonds to backing 12 and to an article 50 with a bond strength that is greater than the delamination force of the backing. After the tamper indicating device 10 has been secured to an article 50, attempts to remove the device 10 will result in internal delamination of backing 12 at a predetermined level of peel force. Upon delamination, the separated portions of the backing become opaque due to surface irregularities in the exposed internal surfaces of the backing created during the delamination of the backing. If present, first indicia 22 are no longer perceptible through second major surface 20 of the backing and are thereby obscured. However, as shown in FIG. 4, the latent second indicia (if present) 24 are no longer obscured on the background of the adhesive 30, but are now readily perceptible against the white opaque background of the separated backing portions. This provides an unambiguous indication of tampering with the device 10. If desired, first indicia 22 may include alphanumeric characters forming a message indicative of a sealed condition for the article when tape 10 is applied. Second indicia 24 may also include alpha numeric characters forming a message that the container has been opened. Another feature of this invention is that the separated backing portions will not re-adhere to each other once separated. This provides a further indication of unauthorized access to the article.

Figure 5:
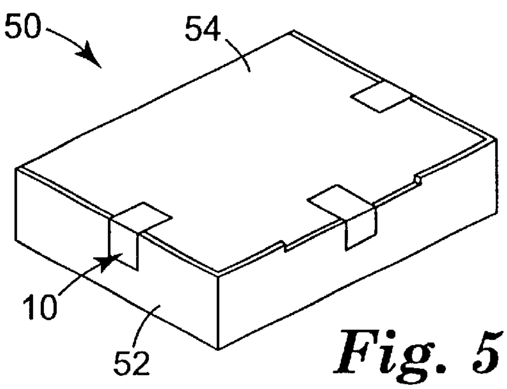
FIG. 5 is an isometric view of an article having a plurality of the devices of FIG. 1 adhered thereto.

FIG. 5 illustrates an embodiment of this invention applied to an article 50 which is a box or like container. One or more tamper indicating devices 10 are adhered to first and second container parts 52 and 54, such as the lid and side panel of the container. Opening the container requires removal or destruction of the device 10 and thus provides an unambiguous indication of access to the interior of the container.

Other preferred embodiments of the tamper indicating device are as follows. In one embodiment, the device includes backing 12 with first indicia 22 on the first major surface 18, and adhesive 30 over the indicia and first surface. Another embodiment comprises a backing 12 having a color, such as white, flood-coated on the second major surface 20, and a layer of adhesive 30 on the first major surface 18, with no indicia on the first surface. Overlaminate 40 and/or release liner 32 may be included in either or both of the just-described embodiments. In another embodiment, the device comprises backing 12 having a color flood-coated on the first major surface, second indicia 24 (e.g., a message such as "OPEN" or "VOID") on the second major surface 20, overlaminate 40 on the second major surface over the second indicia, and adhesive 30 over the flood coat on the first major surface. This embodiment may optionally include a release liner 32.

Device 10 may include information thereon. Such information could include identification of an article 50, an indication than an article 50 is authentic, or any other information that is specifically intended for the particular article 50 to which the device 10 is adhered. An attempt to remove one embodiment of the device 10 to place the information on another article will result in internal delamination of the film backing 12 such that the device could not be re-adhered to another article. Another preferred embodiment of the present invention is a labelstock that will tear or strip upon attempts to remove the device 10 from the intended article to prevent the device from being re-adhered to another article.

Furthermore, blown film backing 12 of the present invention may be used in any of the tamper indicating devices disclosed in U.S. Pat. Nos. 4,876,123 or 4,980,222, the entire disclosures of both of which are incorporated herein.

The operation of the present invention will be further described with regard to the following detailed examples. These examples are offered to further illustrate the various specific and preferred embodiments and techniques. It should be understood, however, that many variations and modifications may be made while remaining within the scope of the present invention.

Materials

FINA 7231: a random copolymer of propylene/ethylene with an approximate ratio of 97:3 respectively (available from FINA Oil and Chemical Company, Dallas Tex.)

FINA Z9470: a random copolymer of propylene/ethylene with an approximate ratio of 91:9 respectively (available from FINA Oil and Chemical Company, Dallas Tex.)

ELVAL LC-E105A: an ethylene/vinyl acetate/vinyl alcohol terpolymer containing 44 mole percent ethylene and being essentially completely hydrolyzed ( available from EVAL Company of America, Lisle, Ill.)

ELVAX 660: an ethylene/vinyl acetate copolymer (available from E. I. du Pont de Nemours and Company, Wilmington Del.

Test Method: Film Backing Cohesive Strength

A piece of film backing 12 having pressure sensitive adhesive 30 on one side was prepared by hand applying 3M Laminating Adhesive 9826, commercially available from Minnesota Mining and Manufacturing Company, St. Paul, Minn., to one side of a piece of the film using one pass of a one pound rubber roller. A piece of the film backing with adhesive, measuring 2 inches by 4 inches, was applied adhesive side down to a polycarbonate substrate measuring 3 inches by 4 inches, and having a thickess of 3/16 of an inch, so that the entire film backing was adhered to the polycarbonate substrate. This was done by hand using one pass of a one pound rubber roller. For samples including optional overlaminate 40, the laminating adhesive was applied to the exposed surface of the backing 12. A piece of 3M Filament Tape 898 measuring 1 inch by 11 inches was applied to the top, exposed surface of the backing 12 or overlaminate 40, if present, using 20 passes of a one pound rubber roller such that approximately 3.5 inches of the filament tape was adhered to the film. The remainder of the filament tape was folded back onto itself. The 0.5 inches of uncovered backing 12 was at the end closest to the folded over end of the filament tape. The assembly was then placed in an Instron Model 112 Tensile Tester with the folded over end of the filament tape in the dynamic clamp fixture and the substrate/film backing in the static clamp fixture. The filament tape was pulled away from the film backing at an angle of 90° to the polycarbonate substrate at a rate of 12 inches per minute. The force required to cause the backing 12 to internally delaminate, i.e. to fail cohesively, was recorded and a cohesive strength in ounces per inch calculated. Three specimens of each film backing were tested and used to calculate the average value reported.

EXAMPLE 1

A film backing according to the present invention was provided in the following manner. A blend of 85 parts by weight (pbw) of FINA 7231 and 15 pbw ELVAL LC-E105A was fed into a pilot scale, low pressure, 2.5 inch diameter single screw extruder having a length:diameter ratio of 24:1, and having 4 temperature zones set at increasing temperatures as follows: Zone 1=300° F.; Zone 2=370° F.; Zone 3=400° F.; and Zone 4=410° F. The backing was formed using a blown extrusion process employing the following parameters: an annular 12 inch diameter die having a temperature at the top and bottom of 400° F.; a cone size of 19 inches; an extruder screw speed 78 revolutions per minute (rpm); using inside air with a rotating air tank. The film with an air bubble was fed upwards approximately 10 feet and then through a nip at a pressure of 15 psi to give a flat bubble size of 27.375 inches. The blow up ratio was 1.56 to 1 and the draw ratio was about 10 to 1. The run speed was 47.5 feet per minute (fpm) and the output for the total web was 185 pounds per hour. Thickness was 0.002 inches.

EXAMPLE 2

Example 2 was prepared as described in Example 1, except extruder screw speed was 130 rpm, run speed was 50.2 fpm, draw ratio was 20:1 and thickness was 0.001 inches.

EXAMPLE 3A

Example 3A was prepared as described in Example 1, except a blend of 75 pbw of FINA 7231 and 25 pbw ELVAL LC-E105A was used. Thickness was 0.002 inches.

EXAMPLE 3B

Example 3B was prepared as described in Example 3A except using production scale equipment, at a blow-up ratio of 1.69:1, a draw ratio of 10: 1, and nip pressure of 65 psi, to obtain a thickness of 0.002 inches.

EXAMPLE 4

Example 4 was prepared as described in Example 1 except a blend of 70 pbw of FINA 7231 and 30 pbw ELVAL LC-EE105A was employed. Thickness was 0.002 inches.

EXAMPLE 5

Example 5 was prepared as described in Example 1 except a blend of 60 pbw of FINA 7231 and 40 pbw ELVAL LC-E105A was employed. Thickness was 0.002 inches.

EXAMPLE 6

Example 6 was prepared as described in Example 1 except a blend of 85 pbw of FINA Z9470 and 15 pbw ELVAL LC-E105A was employed. Thickness was 0.002 inches.

EXAMPLE 7

Example 7 was prepared as described in Example 2 except a blend of 85 pbw of FINA Z9470 and 15 pbw ELVAL LC-E105A was employed. Thickness was 0.001 inches.

EXAMPLE 8

Example 8 was prepared as described in Example 1 except a blend of 70 pbw of FINA Z9470 and 30 pbw ELVAL LC-E105A was employed. Thickness was 0.002 inches.

EXAMPLE 9

Example 9 was prepared as described in Example 1 except a blend of 65 pbw of FINA Z9470 and 35 pbw ELVAL LC-E105A was employed. Thickness was 0.002 inches.

EXAMPLE 10

Example 10 was prepared as described in Example 1 except a blend of 60 pbw of FINA Z9470 and 40 pbw ELVAL LC-E105A was employed. Thickness was 0.002 inches.

EXAMPLE 11

Example 11 was prepared as described in Example 2 except a blend of 60 pbw of FINA Z9470 and 40 pbw ELVAL LC-E105A was employed. Thickness was 0.001 inches.

Comparative Example 1

An attempt was made to prepare a film backing as described in Example 1 with the following modification. A blend of 50 pbw of FINA 7231 and 50 pbw ELVAL LC-E105A was employed. A blown film backing was not obtained.

Comparative Example 2

Comparative example 2 was prepared as described in Example 1 except a blend of 50 pbw of FINA 7231 and 50 pbw ELVAX 660 was employed. The resulting blown film backing exhibited very little cohesive failure upon testing as described in "Film Backing Cohesive Strength."

Comparative Example 3

A cast film backing having a thickness of 0.003 inches was prepared from a blend of 75 pbw FINA 7231 and 25 pbw ELVAL LC-E105A generally in accordance with the teachings of Example 1 of U.S. Pat. No. 4,980,222.

The examples and comparative examples described above were tested for cohesive strength by the method described above, with the results reported in the following table:

| Ex. | Components and Ratio (pbw/pbw) | Backing Thickness (inches) | Cohesive Strength (ounces/ inch) |
|---|---|---|---|
| 1 | FINA 7231: ELVAL LC-E105A/85:15 | 0.002 | 25 |
| 2 | FINA 7231: ELVAL LC-E105A/85:15 | 0.001 | 40 |
| 3A | FINA 7231: ELVAL LC-E105A/75:25 | 0.002 | 4.3 |
| 3B | FINA 7231: ELVAL LC-E105A/75:25 | 0.002 | 6.6 |
| 4 | FINA 7231: ELVAL LC-E105A/70:30 | 0.002 | 8 |
| 5 | FINA 7231: ELVAL LC-E105A/60:40 | 0.002 | 7.9 |
| 6 | FINA Z9470: ELVAL LC-E105A/85:15 | 0.002 | 10.3 |
| 7 | FINA Z9470: ELVAL LC-E105A/85:15 | 0.001 | 10 |
| 8 | FINA Z9470: ELVAL LC-E105A/70:30 | 0.002 | 11.3 |
| 9 | FINA Z9470: ELVAL LC-E105A/65:35 | 0.002 | 8.8 |
| 10 | FINA Z9470: ELVAL LC-E105A/60:40 | 0.002 | 9.3 |
| 11 | FINA Z9470: ELVAL LC-E105A/60:40 | 0.001 | 7 |
| CE 1 | FINA 7231: ELVAL LC-E105A/50:50 | 0.002 | * |
| CE 2 | FINA 7231: ELVAX 660/50:50 | 0.002 | ** |
| CE 3 | FINA 7231: ELVAL LC-E105A/75:25 | 0.003 | 19.5 |

*A blown film backing was not obtained
The blown film backing obtained exhibited very little cohesive failure It can be seen that film backing 12 can be made by the blown extrusion process to have desirable thickness at blends of from 60 to 85 pbw of the first polymer and from 15 to 40 pbw of the second copolymer. It is also seen by comparing Comparative Example 3 to Examples 3A and 3B, that significantly lower cohesive strength may be obtained by the desirable blown film backing 12** of the present invention when compared to known cast film backings of prior tamper indicating devices. The desirable reduction in cohesive strength provides more sensitive indications of attempts at tampering with the device.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. Unless stated otherwise or unless context requires otherwise, all percentages and ratios of component materials is provided in percent by weight or parts by weight, respectively. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A tamper indicating device comprising:

a film backing made by a blown film extrusion process and a layer of adhesive, wherein said backing includes a first, continuous phase and a second, discontinuous phase, wherein said second phase comprises a plurality of inclusions in said first phase, wherein said blown film backing contains from 60 to 85 parts by weight of said first, continuous phase and from 15 to 40 parts by weight of said second, discontinuous phase, wherein said second, discontinuous phase comprises an ethylene/vinyl acetate/vinyl alcohol terpolymer, and wherein said blown film backing is normally light transmissive and becomes opaque upon internal delamination of said backing.

2. A tamper indicating device, comprising:

a film backing made by a blown film extrusion process and a layer of adhesive;

wherein said blown film backing comprises:

a first, continuous phase comprising at least 90 parts by weight polyolefin having 2 to 4 carbon atoms, and a second, discontinuous phase comprising an ethylene/vinyl acetate/vinyl alcohol terpolymer, wherein said second phase comprises a plurality of inclusions in said first phase;

wherein said blown film backing is normally light transmissive, and wherein said blown film backing becomes opaque upon internal delamination of said backing.

3. The tamper indicating device of claim 2, wherein said blown film backing has a thickness of up to 0.003 inches.

4. The tamper indicating device of claim 3, wherein said blown film backing has a thickness of up to 0.002 inches.

5. A tamper indicating device, comprising:

a film backing made by a blown film extrusion process and a layer of adhesive, wherein said blown film backing comprises:

a) a first, continuous phase comprising at least 90 parts by weight polyolefin having 2 to 4 carbon atoms; and b) 15 to 40 parts by weight of a second, discontinuous phase comprising an ethylene/vinyl acetate/vinyl alcohol terpolymer, wherein said second phase comprises a plurality of inclusions in said first phase.

6. A tamper indicating device, comprising:

a film backing made by a blown film extrusion process and a layer of adhesive, wherein said blown film backing comprises:

a) 60 to 85 parts by weight of a first, continuous phase comprising a polyolefin; and b) 15 to 40 parts by weight of a second, discontinuous phase comprising an ethylene/vinyl acetate copolymer or ethylene/vinyl alcohol copolymer, or an ethylene/vinyl acetate/vinyl alcohol terpolymer, wherein said second phase comprises a plurality of inclusions in said first phase, and wherein said blown film backing has a thickness of up to 0.003 inches.

7. A tamper indicating device, comprising:

a film backing made by a blown film extrusion process and a layer of adhesive, wherein said blown film backing comprises:

a) 60 to 85 parts by weight of a first, continuous phase comprising a polyolefin; and b) 15 to 40 parts by weight of a second, discontinuous phase comprising an ethylene/vinyl acetate copolymer or ethylene/vinyl alcohol copolymer, or an ethylene/vinyl acetate/vinyl alcohol terpolymer, wherein said second phase comprises a plurality of inclusions in said first phase, wherein said blown film backing has a thickness of up to 0.002 inches.

* * * * *

UNITED STATES PATENT AND TRADEMARK OFFICE

CERTIFICATE OF CORRECTION

PATENT NO. : 6,395,376 B1
DATED : May 28, 2002
INVENTOR(S) : Cooley, Julian B.

It is certified that error appears in the above-identified patent and that said Letters Patent is hereby corrected as shown below:

Title page,
Item [57], ABSTRACT,
Line 12, delete the word "ant".

Column 1,
Line 60, "discloses" should read -- disclosed --.

Column 6,
Line 19, "a(fpm)" should read -- (fpm) --.
Line 20, "hours A" should read -- hour. A --.

Column 7,
Line 35, "adhesive 10" should read -- adhesive 30 --.

Column 9,
Line 36, "approximately 10" should read -- approximately 30 --.

Signed and Sealed this

Twenty-first Day of January, 2003

JAMES E. ROGAN
*Director of the United States Patent and Trademark Office*